US009274930B2

(12) United States Patent
Morrison

(10) Patent No.: US 9,274,930 B2
(45) Date of Patent: Mar. 1, 2016

(54) DEBUGGING SYSTEM USING STATIC ANALYSIS

(75) Inventor: Vance P. Morrison, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1280 days.

(21) Appl. No.: 12/340,797

(22) Filed: Dec. 22, 2008

(65) Prior Publication Data

US 2010/0162217 A1 Jun. 24, 2010

(51) Int. Cl.
*G06F 9/44* (2006.01)
*G06F 11/36* (2006.01)

(52) U.S. Cl.
CPC ........ *G06F 11/3628* (2013.01); *G06F 11/3604* (2013.01)

(58) Field of Classification Search
CPC ............ G06F 11/362; G06F 11/36228; G06F 11/3636; G06F 11/3664
USPC ......................................................... 717/129
See application file for complete search history.

(56) References Cited

U.S. PATENT DOCUMENTS

| 5,854,924 | A | 12/1998 | Rickel et al. |
| 5,946,484 | A | 8/1999 | Brandes |
| 5,966,539 | A * | 10/1999 | Srivastava ............... G06F 8/433 717/147 |
| 6,678,884 | B1 * | 1/2004 | Kesselman et al. ........... 717/129 |
| 7,051,322 | B2 | 5/2006 | Rioux |
| 7,207,038 | B2 | 4/2007 | Bicsak et al. |
| 2003/0018957 | A1 * | 1/2003 | Bates et al. .................... 717/129 |
| 2005/0028107 | A1 * | 2/2005 | Gomes et al. ................. 715/762 |
| 2007/0288910 | A1 | 12/2007 | Bhat et al. |
| 2008/0098208 | A1 * | 4/2008 | Reid et al. ..................... 712/234 |
| 2008/0127113 | A1 * | 5/2008 | Wu et al. ....................... 717/129 |
| 2008/0178155 | A1 | 7/2008 | Gogh et al. |
| 2009/0037892 | A1 * | 2/2009 | Luedde .................... G06F 8/44 717/153 |
| 2010/0005249 | A1 * | 1/2010 | Bates et al. ................... 711/154 |

OTHER PUBLICATIONS

"Sun Microsystems Documentation", retrieved at <<http://docs.sun.com/app/docs/doc/819-5257/6n7bql83t?a=view>>, Sep. 25, 2008, pp. 2.
"RecStudio", retrieved at <<http://www.backerstreet.com/rec/rec2.htm>>, Sep. 25, 2008. pp. 5.
(Continued)

*Primary Examiner* — Duy Khuong Nguyen
(74) *Attorney, Agent, or Firm* — Kevin Sullivan; Kate Drakos; Micky Minhas

(57) ABSTRACT

A debugging system for compiled code may include static analysis of the compiled code to determine current values for variables at a paused location within the compiled code. The static analysis may consist of liveness analysis to determine which variables are 'live' and in which memory locations those variables are stored. The variables and their values may be presented to a user. The debugging system may include mechanisms for setting stop points, for pausing and continuing execution, as well as stepping through a step or group of steps. Other static analysis may include unwind information that may determine a point in the code from where the current function was called, as well as partial decompilation of the source code to produce a representation of the compiled code that is closer to that of the source code.

20 Claims, 2 Drawing Sheets

(56) References Cited

OTHER PUBLICATIONS

Emmerik, et al., "Using a Decompiler for Real-World Source Recovery", retrieved at <<http://www.itee.uq.edu.au/~emmerik/experience_long.pdf>>, Working Conference on Reverse Engineering, 2004, pp. 13.

Cifuentes, et al., "Decompilation of Binary Programs", retrieved at <<http://www.cs.ubc.ca/local/reading/proceedings/spe91-95/spe/vol25/issue7/spe966cc.pdf>>. Software-Practice and Experience, vol. 25(7), Jul. 1995, pp. 811-829.

* cited by examiner

DEBUGGING SYSTEM USING STATIC ANALYSIS

BACKGROUND

Optimizing compilers may create binary executable programs from high level languages, and may perform many different types of optimization on source code to achieve faster runtime execution and smaller memory footprint. In one example of optimization, complex series of statements in a high level language may be reduced to a few, succinct statements in the binary executable. In another example of optimization, a single register or other memory location may be used for different variables at different stages of a program's execution. The result of an optimizing compiler is often an executable program that does not correlate well with the original high level language.

When debugging an executable program, often much of the debugging is performed without optimizing functions. In many cases, various debugging environments may be used to step through the source code to verify program execution, check variable values, and test the operation of the code. Such debugging functions may become much more difficult when a compiler's optimization functions are used, since the correlation between the executing code and the source code may be degraded.

In many cases, optimizing compilers may generate a program database that may contain some information regarding memory locations and variables, as well as some optimizations performed on the source code. Many such program databases offer some mapping between a source code file and an executable binary, but often not enough information that may allow a debugging application to unwind or decompile the executable binary to correlate with the source code. Even with the program databases, debugging optimized compiled code can be very difficult due to the lack of correlation between the executable code and the original source code.

SUMMARY

A debugging system for compiled code may include static analysis of the compiled code to determine current values for variables at a paused location within the compiled code. The static analysis may consist of liveness analysis to determine which variables are 'live' and in which memory locations those variables are stored. The variables and their values may be presented to a user. The debugging system may include mechanisms for setting stop points, for pausing and continuing execution, as well as stepping through a step or group of steps. Other static analysis may include unwind information that may determine a point in the code from where the current function was called, as well as partial decompilation of the source code to produce a representation of the compiled code that is closer to that of the source code.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
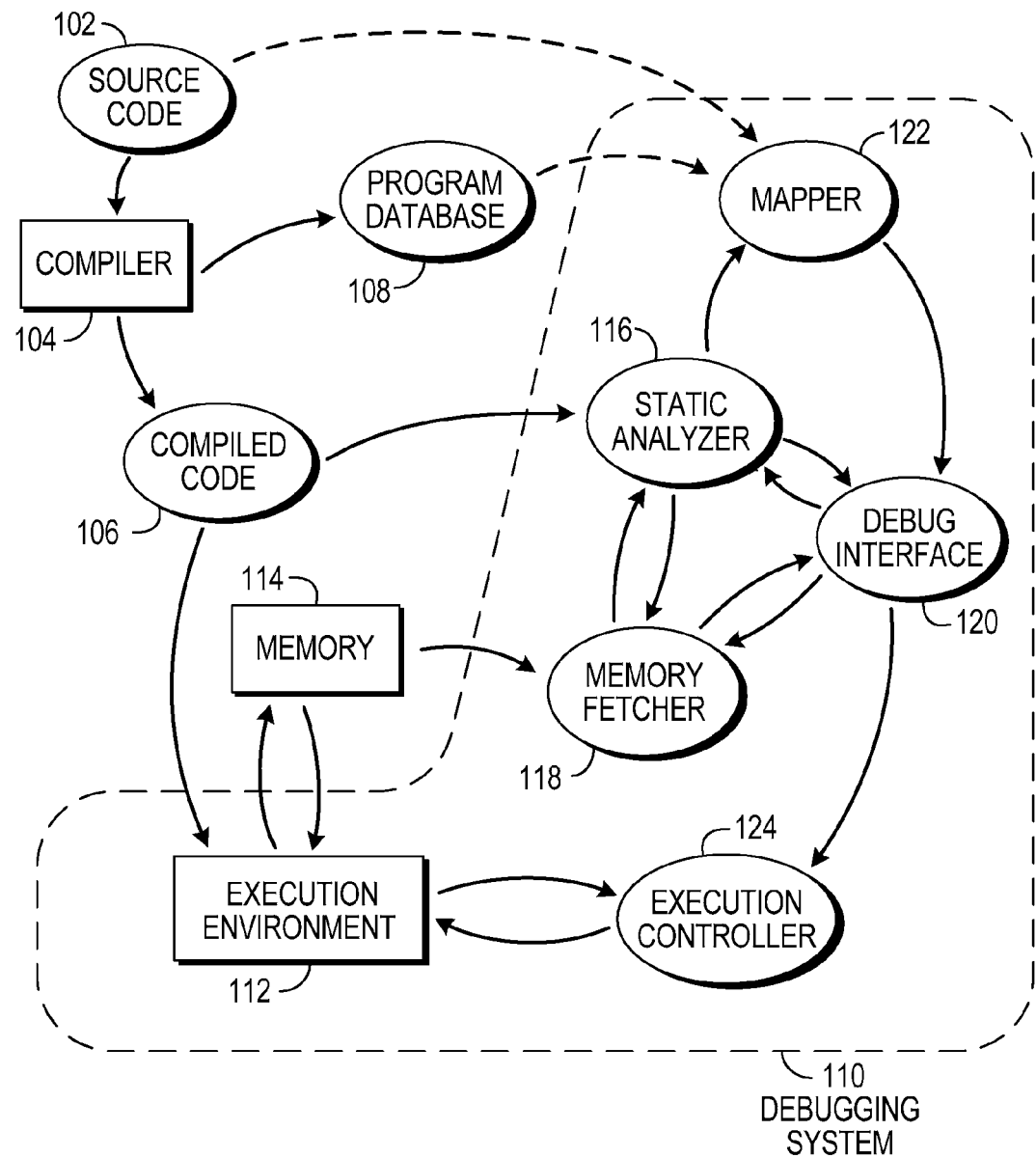
FIG. 1 is a diagram illustration of an embodiment showing a system with static analysis in a debugging system.

A debugging system may use static analysis such as liveness analysis to determine information that may be useful when debugging compiled code. The liveness analysis may determine which variables are live at a paused location within an executing compiled code. The liveness analysis may be used to determine memory locations in which specific variables are stored, and the variables and their values may be displayed in a debugging user interface.

The debugging system may use the compiled code to determine information about the executing code. The static analysis of the compiled code may supplement information from the source code, or may provide enough information on its own to assist a developer to debug the code. In some embodiments, a program database created by a compiler may be used as an additional reference. Some such embodiments may map source code variable names to the variables in the compiled code.

The debugging system may allow a user to manage the execution of the compiled code by setting breakpoints, allowing the user to step through commands individually, and through other mechanisms. In many embodiments, a liveness analysis may be performed at a breakpoint and variables and their values may be presented on a user interface.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a debugging system with a static analyzer. Embodiment 100 is a simplified example of a debugging system that incorporates static analysis to analyze compiled code and present useful information to a user.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

In a typical development cycle for a computer program or application, a developer may write source code 102 in a high level language and perform much of the debugging of the source code using sophisticated symbolic debugging systems. The debugging systems for source code may execute the source code, identify errors with detailed analysis tools, display variable names and values, and have sophisticated mechanisms for traversing the source code. In many systems, the source code may be executed using non-optimized compiled versions.

The source code 102 may be compiled by a compiler 104 to create compiled code 106.

Many compilers may perform optimizations to the code. Many different types of optimization may be performed, including loop optimizations, replacing groups of commands with one command or a shorter sequence of commands, performing various data flow optimizations, register and memory allocation, and various other optimizations.

The result of the many different types of code optimization is that the optimized compiled code often bears little resemblance to the source code. In particular, one form of optimization may use a single register or memory location for different variables throughout the execution of the optimized compiled code. When a variable is no longer used and a new variable is established, an optimized compiled code may use the same memory location for both variables.

Because a single memory location may be used for two or more variables at different times during execution, the value in the memory location may not reflect a given variable unless that variable is 'live'. In order to determine a value for a variable, two pieces of information may be used: the memory location to which the variable is assigned and whether the variable is live at the time the memory location is queried.

Many compilers may create a program database 108 or some other output that may include symbols used in the source code and where the symbols may be referenced in the source code. The program database 108 may also include addresses for the various symbols. The symbols typically refer to the names of variables, methods, or other objects from the source code. In some embodiments, a program database may be used to map names from the source code 102 to various elements of the compiled code 106.

In many embodiments, a program database 108 may be created by a compiler 104 and used by a program developer. The program database 108 may or may not be distributed with the compiled code 106, and may or may not be available during debugging.

A debugging system 110 may execute the compiled code 106 in a controlled manner and may have a user interface on which memory contents of variable locations may be presented. The debugging system 110 may use static analysis to determine the liveness of variables, and present those variables that are live. Variables that are not live may not be presented, or may be presented in a manner that indicates that the variables are not current.

The debugging system 110 may use a debug interface 120 to execute the complied code 106 in a controlled manner. The debug interface 120 may be a graphical user interface through which a user may set breakpoints, start and stop execution, step through commands within the compiled code 106, execute subroutines or other portions of the compiled cod 106, and input other commands that may be performed by an execution controller 124. The execution controller 124 may be a set of functions that may control and manage the execution of compiled code 106 within the execution environment 112 based on commands received through the debug interface 120.

When the compiled code 106 has reached a breakpoint within the execution environment 112, a static analyzer 116 may perform static analysis on the compiled code 106 to determine which variables are live. Liveness analysis may determine if a variable may be used in the future operation of the compiled code 106. In some embodiments, liveness analysis may be performed periodically or at various stages during execution of the compiled code, resulting in accurate display of the variable values.

In some embodiments, a liveness analysis may determine if a variable is live by first determining if a variable has been set, and then looking forward in the code to determine if the variable is used again. If the variable is not used again, the variable may be labeled as not live. Such embodiments may use a classical liveness analysis.

In other embodiments, a liveness analysis may determine if a variable is live by determining if the variable has been set, and then ensuring that the memory location for that variable has not been overwritten by another variable. In such an embodiment, a variable may be considered live if the value is current, even when the variable is no longer used, so long as the memory location has not been overwritten with a different variable.

The debugging system 110 may have an execution environment 112 that may use various forms of memory 114 to store data. In many cases, data may be stored in registers, random access memory, and other locations. The execution environment 112 may present the data in a viewable format through the debug interface 120. In many embodiments, a user may select which variables or memory locations may be displayed.

When a variable is determined to be live, the register or memory location to which the variable is assigned may contain the actual value of the variable. If a variable is not determined to be live, the same register or memory location may have been used by another variable and thus the values in the register or memory location may not be trusted. Such a memory location may be considered to have a value of 'unknown'.

For those variables determined to be live, a memory fetcher 118 may retrieve the values from the memory 114 and the values and the variables may be displayed on the debug interface 120.

For those variables determined not to be live, the debug interface 120 may display the variables in a manner that shows that the variable is not live. For example, a previously displayed variable may be grayed-out. In another example, a previously displayed variable may have an inactive icon displayed with the value, or the value may be replaced with "-" or some other indicator. In some embodiments, the variable may be removed from the debug interface 120 completely.

In some embodiments, the program database 108 may be used by a mapper 122 to determine the symbol names for the variables, where the symbol names correspond with the source code 102. In such embodiments, the symbol names may be displayed in the debug interface 120 along with the values for the variable.

Some embodiments may perform a symbolic execution of the program from a paused location. The symbolic execution, sometimes referred to as simulated execution, may simulate the execution to a point that the current function returns, at which point the calling function can be determined. In some embodiments, a reduced number of registers may be simulated, namely the stack pointer and frame pointer, in order to determine the calling function.

After determining the calling function, the debug interface 120 may present the calling function on a user interface. In many embodiments, a line number, function name, or some other representation or identifier of the function may be presented.

The symbolic execution may also determine where machine register values were saved by the current function before the register values were reused for the calling function. In many cases, a function restores the registers to the state they were when the calling function made the call to the current function. In many cases, the symbolic execution may encounter the instructions to restore the registers, enabling those registers to be located and displayed by the debug interface 120.

In many embodiments, the symbolic execution may enable a debugging interface to determine the caller of a function and display a full stack of method calls that may have been made to reach a particular point in the execution. For each function in the stack, the live variables including those held in machine registers may be displayed using the machine register state recovered from each function.

In some embodiments, static analysis may be used to decompile the compiled code 106 into a representation that is closer to the source code 102. Such a representation may be easier to understand than highly optimized code. The decompiling process may involve matching patterns in the compiled code 106 with corresponding higher level constructs that are defined in the source code 102. Such higher level constructs may include variable assignments, array indexing, if-then-else statements, and other constructs.

In many cases, matching the higher level constructs of the source code 102 to the compiled code 106 may involve identifying variables that are used within the higher level constructs. When a variable is used only within the construct, a liveness analysis on the variable may determine whether that higher level construct is correctly matched between the source code 102 and the compiled code 106. In many cases, such decompiling may be performed without a program database 108, and may be useful in cases where the program database 108 is not present.

The debugging system 110 may enable a programmer or developer to see the variable values in optimized compiled code during execution, even when a memory location may be used for two or more different variables.

Figure 2:
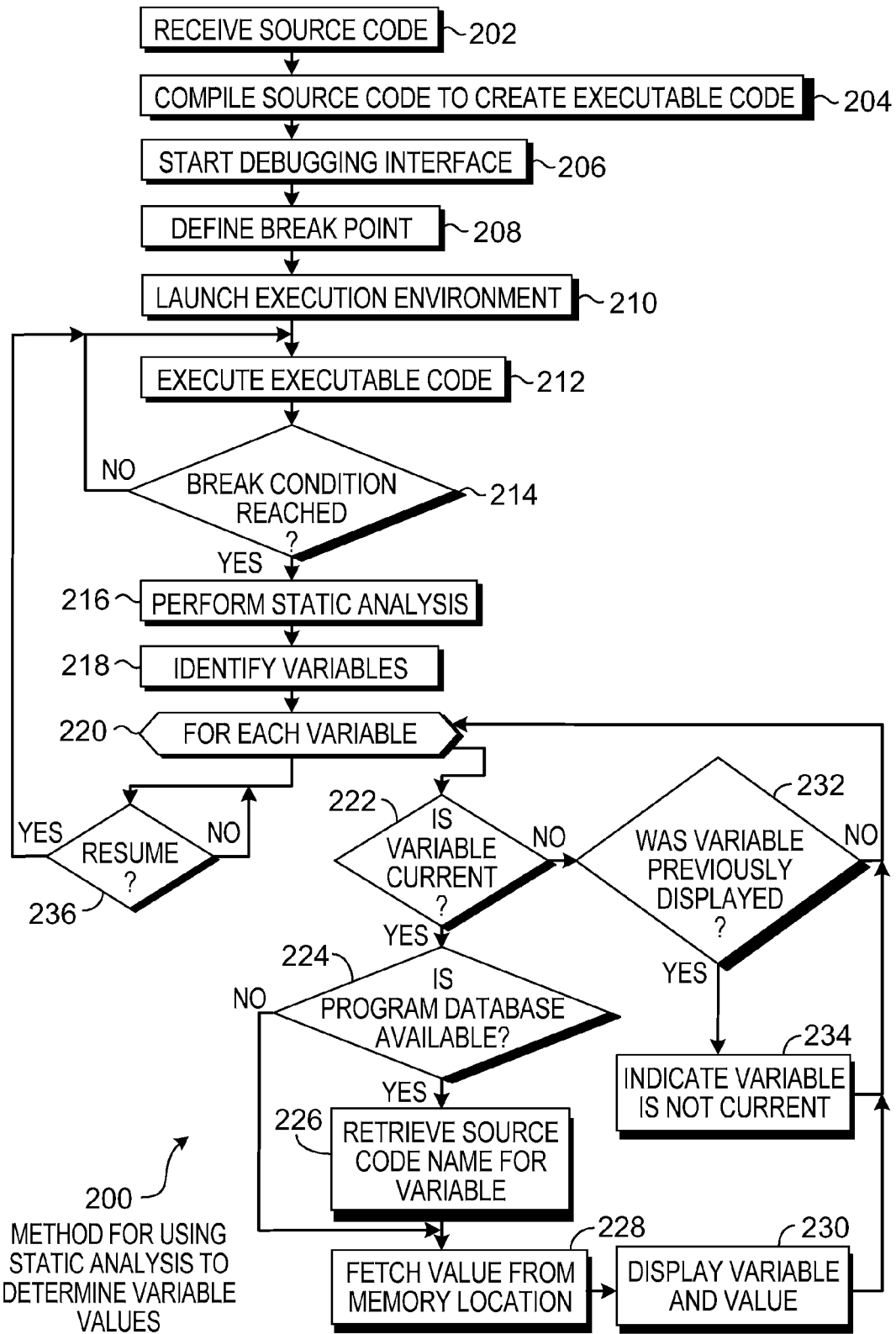
FIG. 2 is a flowchart illustration of an embodiment showing a method for using static analysis to determine variable values.

FIG. 2 is a flowchart illustration of an embodiment 200 showing a method for using static analysis to determine variable values in a debugging setting. Embodiment 200 is a simplified example of some of the steps that may be performed by a debugging system, such as the debugging system 110.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Source code may be received in block 202. The source code may be compiled in block 204 to create executable code. The operations of blocks 202 and 204 may be performed at some point prior to starting a debugger interface in block 206. In some cases, a program may be compiled many years prior to operating a debugger.

The debugging interface of block 206 may have an environment in which the executable code may be run in a controlled manner, as well as a user interface in which values for data objects may be presented to a user.

A breakpoint may be determined in block 208, and the execution environment may be launched in block 210. The executable code may execute in block 212 until a pause or break condition is reached in block 214. The breakpoint may be determined using any practicable mechanism in block 208.

In some cases, a location may be chosen within source code or compiled code. In other cases, a breakpoint may be chosen as an expression, such as when a variable equals a specific value. Some expressions may include inequalities and may have references to two or more variables. Other breakpoint expressions may also be used.

The operations of blocks 208 through 214 are one example of how a complied code may be executed in a controlled manner. In other embodiments, a user may be able to determine a breakpoint after the compiled code begins operation. In such an embodiment, the user may press a key or combination of keys to stop execution, for example. After the key is pressed, the compiled code may enter a paused mode where execution is halted. In some such embodiments, a user may be able to step through the compiled code one command or group of commands at a time. In many such cases, a user may be able to press a key to step forward one step at a time. By pressing the key repeatedly, the user may be able to advance through the execution.

When the pause condition is reached in block 214, the execution environment may keep any memory locations current so that the debugging system may retrieve values in the memory locations and so that the execution environment may continue execution.

After the pause condition is reached in block 214, static analysis may be performed in block 216. The static analysis may determine which variables, if any, are still active within the compiled code. In many cases, optimized compiled code may have instances where two or more different variables may be assigned the same memory location at different times during execution.

Variables of interest may be defined in block 218. In many debugging environments, a user may be able to select a subset of all variables or a subset of available variables. In some environments, all of the variables may be selected in block 218.

For each of the variables selected in block 218, a routine may be performed in block 220.

The routine of block 220 may begin with evaluating a condition concerning whether the variable is current in block 222. The state of the variable is determined in the static analysis of block 216 where each variable is identified and determined if the variable is current or not.

If the variable is current in block 222, and a program database is available in block 224, the source code name of the variable may be retrieved from the program database in block 226. The value of the variable may be fetched from the memory location in block 228, and the variable and value may be displayed in block 230. In such a case, the variable may be displayed with the source code name of the variable. The process may return to block 220 to process the next variable.

If the variable is current in block 222, and a program database is not available in block 224, the value of the variable may be retrieved from the memory location in block 228 and the variable and the value may be displayed in block 230. In such a case, the source code name of the variable may not be available, so the variable may be displayed using the compiled name of the variable. The process may return to block 220 to process the next variable.

If the variable is not current in block 222, and the variable was not previously displayed in block 232, no action is taken and the process returns to block 220. The process may return to block 220 to process the next variable.

If the variable is not current in block 222, and the variable was previously displayed in block 232, the variable may be changed to indicate that it is not current in block 234. In many cases, the value associated with the variable may be removed, grayed out, or somehow indicated that it is not current. The process may return to block 220 to process the next variable.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. At a computer system, the computer system having a plurality of hardware memory storage locations used for storing values for variables during the execution of binary code, a method for debugging binary code, the method comprising:
   executing a compiled binary code to a first breakpoint, the compiled binary code having been created from source code using a compiler, the binary code optimized to reuse the plurality of hardware memory storage locations for storing values for different variables used within the binary code at different times during execution;
   identifying a variable used within binary code, the variable having a variable name defined in the source code;
   at the first breakpoint, performing a static analysis on the compiled binary code, including:
      performing a liveness analysis to determine that the identified variable is currently live, even when the variable is no longer used, the liveness analysis including:
         determining that the identified variable has been set;
         determining a hardware memory storage location for the identified variable, from among the plurality of hardware memory storage locations, that stores a value for the identified variable, the hardware memory storage location configured to store values for different variables, from among a plurality of different variables including the identified variable, at different times during execution of the binary code; and
         checking if the identified variable is live at the determined hardware memory storage location by determining that the stored value is current, including ensuring that the determined hardware memory storage location has not been overwritten with a value for another variable included in the plurality of different variables;
   retrieving the value from the hardware memory storage location in response to determining that the identified variable is live; and
   presenting the identified variable and the value on a user interface.

2. The method of claim 1 further comprising:
   executing the compiled binary code to a second breakpoint;
   performing the static analysis to determine that the first variable is not being used; and
   changing presentation of the value on the user interface in response to determining that the first variable is not being used.

3. The method of claim 2, the changing presentation of value comprising removing the value.

4. The method of claim 2, the changing the presentation of the value comprising graying out the value.

5. The method of claim 1 further comprising:
   executing the compiled binary code to a second breakpoint;
   performing the static analysis to determine that the value in the hardware memory storage location is associated with a second variable; and
   changing the user interface show the second variable and the value.

6. The method of claim 1, further comprising:
   decompiling the binary code into a representation that is more easily understood by a human user; and presenting at least part of the more easily understood representation along with the identified variable and the value on the user interface.

7. The method of claim 1, the static analysis comprising simulated execution.

8. The method of claim 1 further comprising:
matching the variable to a variable name using a program database created by the compiler; and
presenting the variable name on the user interface.

9. A system comprising:
a processor;
a plurality of hardware memory storage locations for storing values for variables used during the execution of binary code;
an execution environment, using the processor, configured to receive a compiled binary code and use the processor to execute the binary code to a breakpoint, the binary code being created by a compiler from a source code, the binary code optimized to reuse the plurality of hardware memory storage locations for storing values for different variables used within the binary code at different times during execution;
a debugging interface in which a user may select a variable; and
a static analyzer, using the processor, configured to:
perform a static analysis on the compiled binary code at the first breakpoint, including:
perform a liveness analysis to determine that a selected variable is currently live, even when the selected variable is no longer used, the liveness analysis including:
determine that the selected variable has been set to a value; determine a hardware memory storage location for the selected variable, from among the plurality of hardware memory storage locations, that stores the value for the selected variable, the hardware memory storage location configured to store values for different variables, from among a plurality of different variables including the selected variable, at different times during execution of the binary code; and
check if the selected variable is live at the determined hardware memory storage location by determining that the stored value is current, including ensuring that the determined hardware memory storage location for the selected variable has not been overwritten with a value for another variable included in the plurality of variables;
retrieve the value from the hardware memory storage location in response to determining that the identified variable is live; and
wherein the debugging interface, using the processor, is further configured to display the selected variable and the value.

10. The system of claim 9, the compiler being an optimizing compiler.

11. The system of claim 9, the debugging interface, using the processor, configured to define the breakpoint.

12. The system of claim 11, the breakpoint being defined with respect to the source code.

13. The system of claim 11, the breakpoint being defined with respect to the compiled binary code.

14. The system of claim 9, the debugging interface, using the processor, configured to read a program database created by the compiler to determine a source code name for the selected variable.

15. A system comprising:
a processor;
a plurality of hardware memory storage locations for storing values for variables used during the execution of binary code;
an execution environment, using the processor, configured to receive a compiled binary code and execute the binary code to a first breakpoint and a second breakpoint, the binary code being created by a compiler from a source code, the binary code optimized to reuse the plurality of hardware memory storage locations for storing values for different variables used within the binary code at different times during execution;
a debugging interface in which a user may select the first breakpoint, the second breakpoint, and a variable; and
a static analyzer, using the processor, configured to:
perform a static analysis on the binary code at the first breakpoint, including:
perform a liveness analysis to determine that a selected variable is currently live, even when the selected variable is no longer used, the liveness analysis including:
determine that the selected variable has been set;
determine a hardware memory storage location for the selected variable, from among the plurality of hardware memory storage locations, that stores a value for the selected variable, the hardware memory storage location configured to store values for different variables, from among a plurality of different variables including the identified variable, at different times during execution of the binary code; and
checking if the selected variable is live at the determined hardware memory storage location by determining that the stored value is current, including ensuring that the determined hardware memory storage location has not been overwritten with a value for another variable included in the plurality of variables;
perform a subsequent static analysis on the binary code at the second breakpoint, including:
perform a further liveness analysis to determine that the value stored at the hardware memory storage location is now associated with a different variable; and
wherein the debugging interface, using the processor, is further configured to display the value when the execution environment has paused at the first breakpoint and at the second breakpoint.

16. The system of claim 15, the hardware memory storage location being used for the first variable at the first breakpoint and a second variable at the second breakpoint.

17. The system of claim 15, the first variable being stored in a first hardware memory storage location at the first breakpoint and a second hardware memory storage location at the second breakpoint.

18. The system of claim 15, the first breakpoint being defined prior to executing the compiled binary code.

19. The system of claim 15, the second breakpoint being defined after beginning executing the compiled binary code.

20. The system of claim 15, the compiler being an optimizing compiler.

* * * * *